(12) United States Patent
De Atley et al.

(10) Patent No.: US 8,428,570 B2
(45) Date of Patent: *Apr. 23, 2013

(54) SERVICE PROVIDER ACTIVATION

(75) Inventors: Dallas De Atley, San Francisco, CA (US); Jeffrey Bush, San Jose, CA (US); Jerry Hauck, Windermere, FL (US); Ronald Keryuan Huang, Milpitas, CA (US); Brainerd Sathianathan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,184

(22) Filed: Apr. 15, 2011

(65) Prior Publication Data

US 2011/0195751 A1 Aug. 11, 2011

Related U.S. Application Data

(63) Continuation of application No. 11/849,286, filed on Sep. 1, 2007, now Pat. No. 7,929,959.

(51) Int. Cl.
*H04M 3/00* (2006.01)

(52) U.S. Cl.
USPC ........ 455/418; 455/410; 455/411; 455/412.1; 380/245; 380/250; 380/248; 380/270; 380/249; 713/161; 713/156; 713/171; 713/183; 379/161

(58) Field of Classification Search ................ 455/418, 455/410, 411, 412; 380/245, 250, 248, 270, 380/249; 713/161, 156, 171, 183; 379/161
See application file for complete search history.

(56) References Cited

U.S. PATENT DOCUMENTS

| | | | |
|---|---|---|---|
| 3,876,942 A | 4/1975 | Koster et al. | |
| 5,386,455 A | 1/1995 | Cooper | |
| 5,444,764 A | 8/1995 | Galecki | |
| 5,835,061 A | 11/1998 | Stewart | |
| 6,124,799 A * | 9/2000 | Parker | 340/5.85 |

(Continued)

FOREIGN PATENT DOCUMENTS

| DE | 198 23 074 | 11/1999 |
|---|---|---|
| EP | 0367361 | 5/1990 |

(Continued)

OTHER PUBLICATIONS

"European Search Report for Application No. 08250053, dated Apr. 24, 2008", Whole Document.

(Continued)

*Primary Examiner* — Kwasi Karikari
(74) *Attorney, Agent, or Firm* — Blakely, Sokoloff, Taylor & Zafman LLP

(57) ABSTRACT

Systems and methods for activating a mobile device for use with a service provider are described. In one exemplary method, a mobile device having a currently inserted SIM card may be prepared for activation using a signing process in which an activation server generates a signed activation ticket that uniquely corresponds to the combination of the device and SIM card, and that is securely stored on the mobile device. In another exemplary method the mobile device may be activated in an activation process in which the device verifies an activation ticket against information specific to the device and SIM card, and initiates activation when the verification of the activation ticket is successful.

122 Claims, 7 Drawing Sheets

U.S. PATENT DOCUMENTS

| | | | |
|---|---|---|---|
| 6,134,435 | A | 10/2000 | Zicker et al. |
| 6,137,783 | A | 10/2000 | Sallberg |
| 6,185,427 | B1 | 2/2001 | Krasner et al. |
| 6,199,045 | B1 | 3/2001 | Giniger et al. |
| 6,259,405 | B1 | 7/2001 | Steward et al. |
| 6,263,214 | B1 | 7/2001 | Yazaki et al. |
| 6,295,291 | B1 | 9/2001 | Larkins |
| 6,321,079 | B1 | 11/2001 | Cooper |
| 6,323,846 | B1 | 11/2001 | Westerman et al. |
| 6,456,234 | B1 | 9/2002 | Johnson |
| 6,487,403 | B2 | 11/2002 | Carroll |
| 6,570,557 | B1 | 5/2003 | Westerman et al. |
| 6,611,687 | B1 | 8/2003 | Clark et al. |
| 6,615,213 | B1 | 9/2003 | Johnson |
| 6,621,079 | B1 | 9/2003 | Shao et al. |
| 6,677,894 | B2 | 1/2004 | Sheynblat et al. |
| 6,677,932 | B1 | 1/2004 | Westerman |
| 6,731,238 | B2 | 5/2004 | Johnson |
| 6,879,825 | B1 | 4/2005 | Daly |
| 6,888,536 | B2 | 5/2005 | Westerman et al. |
| 7,054,642 | B1 | 5/2006 | Matz et al. |
| 7,187,997 | B2 | 3/2007 | Johnson |
| 7,710,290 | B2 | 5/2010 | Johnson |
| 7,929,959 | B2 * | 4/2011 | De Atley et al. ............ 455/418 |
| 2002/0082048 | A1 | 6/2002 | Toyoshima |
| 2002/0085530 | A1 | 7/2002 | Toyoshima |
| 2002/0197992 | A1 | 12/2002 | Nizri et al. |
| 2003/0021413 | A1 | 1/2003 | Kiiveri et al. |
| 2003/0083068 | A1 | 5/2003 | Wong |
| 2003/0119515 | A1 | 6/2003 | Holler et al. |
| 2004/0092248 | A1 | 5/2004 | Kelkar et al. |
| 2004/0102183 | A1 | 5/2004 | Haub et al. |
| 2004/0121802 | A1 | 6/2004 | Kim et al. |
| 2004/0142725 | A1 | 7/2004 | Kim |
| 2004/0176133 | A1 | 9/2004 | Lipsit |
| 2004/0235458 | A1 | 11/2004 | Walden et al. |
| 2004/0242224 | A1 | 12/2004 | Janik et al. |
| 2004/0248550 | A1 | 12/2004 | Hausner et al. |
| 2005/0009502 | A1 | 1/2005 | Little et al. |
| 2005/0054338 | A1 | 3/2005 | Hosokawa |
| 2005/0079863 | A1 | 4/2005 | Macaluso |
| 2005/0120209 | A1 | 6/2005 | Kwon et al. |
| 2005/0141438 | A1 | 6/2005 | Quetglas et al. |
| 2006/0009214 | A1 | 1/2006 | Cardina et al. |
| 2006/0046717 | A1 | 3/2006 | Bovell et al. |
| 2006/0063564 | A1 | 3/2006 | Sharma |
| 2006/0095339 | A1 | 5/2006 | Hayashi et al. |
| 2006/0105810 | A1 | 5/2006 | Gnuschke |
| 2006/0107037 | A1 * | 5/2006 | Lincoln et al. ................ 713/155 |
| 2006/0112275 | A1 * | 5/2006 | Jeal et al. ...................... 713/183 |
| 2006/0143098 | A1 | 6/2006 | Lazaridis |
| 2006/0154647 | A1 | 7/2006 | Choi |
| 2006/0160569 | A1 | 7/2006 | Chen et al. |
| 2006/0183500 | A1 | 8/2006 | Choi |
| 2007/0050622 | A1 | 3/2007 | Rager et al. |
| 2007/0082655 | A1 | 4/2007 | Link et al. |
| 2007/0094737 | A1 | 4/2007 | Larsson et al. |
| 2007/0129057 | A1 | 6/2007 | Xu et al. |
| 2007/0142725 | A1 | 6/2007 | Hardin et al. |
| 2007/0167161 | A1 | 7/2007 | Cheng et al. |
| 2007/0235458 | A1 | 10/2007 | Hewkin |
| 2007/0264983 | A1 | 11/2007 | Chen et al. |
| 2008/0003980 | A1 | 1/2008 | Voss et al. |
| 2008/0070549 | A1 | 3/2008 | Wang |
| 2008/0090614 | A1 * | 4/2008 | Sicher et al. .................. 455/558 |
| 2008/0166993 | A1 | 7/2008 | Gautier et al. |
| 2008/0167027 | A1 | 7/2008 | Gautier et al. |
| 2008/0167036 | A1 | 7/2008 | Bush et al. |
| 2008/0318550 | A1 | 12/2008 | DeAtley |
| 2009/0061840 | A1 | 3/2009 | Fleischman et al. |
| 2009/0061934 | A1 | 3/2009 | Hauck et al. |
| 2009/0181662 | A1 | 7/2009 | Fleischman et al. |

FOREIGN PATENT DOCUMENTS

| | | |
|---|---|---|
| EP | 1261170 | 11/2002 |
| EP | 1276339 | 1/2003 |
| EP | 1521491 | 4/2005 |
| EP | 1 565 016 | 8/2005 |
| EP | 1679925 | 7/2006 |
| EP | 1748661 | 1/2007 |
| EP | 2079256 | 7/2009 |
| GB | 2428544 | 1/2007 |
| WO | WO 96/35304 | 11/1996 |
| WO | WO-97/42783 | 11/1997 |
| WO | WO-01/15414 | 3/2001 |
| WO | WO 01/19120 | 3/2001 |
| WO | WO-02/058361 | 7/2002 |
| WO | WO-03/041443 | 5/2003 |
| WO | WO-2004/057485 | 7/2004 |
| WO | WO-2004082310 | 9/2004 |
| WO | WO-2004/105421 | 12/2004 |
| WO | WO-2006054980 | 5/2006 |
| WO | WO-2006/084183 | 8/2006 |
| WO | WO-2007079425 | 7/2007 |
| WO | WO-2008085255 | 7/2008 |
| WO | WO-2009002649 | 12/2008 |
| WO | WO-2009032853 | 3/2009 |

OTHER PUBLICATIONS

"European Search Report for Application No. 10184873.7", (Feb. 17, 2011), Whole Document.

"International Preliminary Report on Patentability for Application No. PCT/US2008/064971, dated Jan. 7, 2010", Whole Document.

"International Search Report and Written Opinion for Application No. PCT/US2008/050340, dated Apr. 24, 2008", Whole Document.

"Notice of Allowance for U.S. Appl. No. 11/849,286", (Dec. 9, 2010), Whole Document.

"Office Action for U.S. Appl. No. 12/014,089", (Jul. 30, 2010), Whole Document.

"Office Action for U.S. Appl. No. 11/849,286", (Jun. 22, 2010), Whole Document.

"PCT International Preliminary Report on Patentability (Chapter I of the Patent Cooperation Treaty) for Application No. PCT/US2008/009007", (Mar. 11, 2010), Whole Document.

De Atley, et al., "Service Provider Activation," U.S. Appl. No. 11/849,286, filed Sep. 1, 2007. Whole Document.

EPO "European Extended Search Report", issued in European Application No. 08250050.5., (May 5, 2008), Whole Document.

EPO "European Search Report", Application No. 09000426.8-2413, (May 27, 2009), Whole Document.

EPO "Search Report", issued in European Application No. 09000426.8, dated (May 27, 2009), Whole Document.

PCT "International Preliminary Report on Patentability (Chapter I of the Patent Cooperation Treaty) and Written Opinion for Application No. PCT/US2008/009009", (May 6, 2010) Whole Document.

PCT "International Search Report and Written Opinion", issued in International Application No. PCT/US2008/050343. (Jan. 5, 2009), Whole Document.

PCT "International Search Report and Written Opinion", issued in International Application No. PCT/US2008/0064971. (Jan. 20 2009), Whole Document.

PCT "International Search Report and Written Opinion", PCT/US2008/009009, (Nov. 17, 2008), 1-12.

PCT "International Search Report and Written Opinion", PCT/US2008/009007, (Nov. 18, 2008), 1-12.

PCT "International Search Report and Written Opinion", PCT/US2009/031016, (May 27, 2009), Whole Document.

PCT "International Search Report and Written Opinion", issued in International Application No. PCT/US2008/075138. (Feb. 6, 2009), Whole Document.

PCT "International Search Report and Written Opinion", issued in International Application No. PCT/US2009/031016. (May 27, 2009), Whole Document.

PCT "Invitation to Pay Fees and Partial International International Search Report", issued in International Application No. PCT/US2008/064971. (Oct. 22, 2008), Whole Document.

International Preliminary Report on Patentability for International Application No. PCT/US2008/050340, mailed Jul. 7, 2009.

PCT International Preliminary Report on Patentability, issued in International Application No. PCT/US2008/050343, mailed Jul. 7, 2009.

* cited by examiner

SERVICE PROVIDER ACTIVATION

PRIORITY AND CROSS-REFERENCE TO RELATED APPLICATIONS

This application is a continuation of and claims priority to co-owned U.S. patent application Ser. No. 11/849,286, entitled "SERVICE PROVIDER ACTIVATION", filed on Sep. 1, 2007, now U.S. Pat. No. 7,929,959. This application is related to co-owned U.S. patent application Ser. No. 12/849,286, entitled "SERVICE PROVIDER ACTIVATION WITH SUBSCRIBER IDENTITY MODULE POLICY", filed on Sep. 1, 2007, now U.S. Pat. No. 8,032,181, and co-owned U.S. patent application Ser. No. 13/252,096, by the same title, filed on Oct. 3, 2011, each of the foregoing being incorporated herein by reference in its entirety.

BACKGROUND

Mobile devices that are manufactured for use with the Global System for Mobile Communications (GSM) digital cellular phone technology are designed to work with any mobile communications network service provider. The device requires the use of a subscriber identity module (SIM), referred to as a SIM card, which must be inserted into the GSM device to sign on to the subscriber's service provider network. The SIM card is a small circuit board that contains, among other things, an identifier that identifies the service provider with which the SIM card is allowed to be used. Typically, each service provider, such as AT&T, or Verizon, is assigned their own range of SIM card identifiers for use with their networks.

Most GSM devices are manufactured with a service provider lock that restricts the device to SIM cards for a particular service provider. For example, a mobile device manufactured by Nokia that is marketed by an AT&T service provider may have a lock that restricts the device to SIM cards encoded with identifiers falling within the range of SIM card identifiers assigned for use with the AT&T network.

The method of enforcing the service provider lock may vary from one manufacturer to the next. When a device is manufactured with a service provider lock, the lock is usually based on a code that is stored in the device or derived using an algorithm. However, the codes and/or algorithms may be compromised such that the device may be unlocked and used with SIM cards having identifiers assigned for use with other service providers. This results in a loss of revenue for the original service provider, since the device is, presumably, no longer being used on their network.

From the GSM device manufacturer's point of view, there are other drawbacks to manufacturing devices with service provider locks. For example, manufacturing a device with a particular service provider lock may require the manufacturer to maintain different part numbers for the mobile devices manufactured for the different service providers, since the locking codes and/or algorithms will vary depending on the service provider. This can add to the logistical complexity of manufacturing the device as well as add significant inventory cost.

From the consumers' point of view, most would likely prefer the freedom of purchasing a mobile device without being restricted to one particular service provider. For example, it may be desirable to switch to a different service provider when traveling abroad or to different parts of the country.

SUMMARY OF THE DETAILED DESCRIPTION

Methods and systems for service provider activation in a mobile device are described.

According to one aspect of the invention, a mobile device operates in limited service mode until activated for use with a particular service provider. The mobile device may be prepared for activation through the use of a service provider signing process, and subsequently activated for use with a particular service provider through the use of a service provider activation process. The service provider signing and activation processes are performed in accordance with embodiments of the invention.

According to one aspect of the invention, the service provider signing process prepares the device for activation by causing an activation ticket to be stored on the device that securely incorporates information from both the device and the SIM card that is inserted into the device during the signing process.

According to another aspect of the invention, the service provider activation process verifies that an activation ticket previously stored on the device is authentic and corresponds to both the device and the SIM card currently inserted into the device prior to activating the device for use on the service provider's network.

According to one aspect of the invention, when a new SIM card is inserted into the device, or when the device is rebooted, the service provider signing and activation processes are repeated as necessary to activate the device for use with the service provider identified in the currently inserted SIM card. For example, when the currently inserted SIM card has already undergone the signing process during a previous insertion into the device, then only the activation process is needed to activate the device. When the SIM card is new to the device (i.e., has not yet been through either the signing or activation process on this device), both the signing and activation processes are repeated to activate the device for use with the service provider.

According to one aspect of the invention, the service provider signing process may be repeated for different SIM cards such that more than one activation ticket may be stored on the device. Each activation ticket stored on the device corresponds to one of the SIM cards that were inserted into the device during the signing process. In this manner, the mobile device may be prepared for activation with different service providers corresponding to the different SIM cards used during the signing process (as long as the subscriber accounts with those service providers are still valid at the time of activation).

According to one aspect of the invention, the service provider signing process includes generating an activation request into which information is bundled from both the device and the SIM card currently inserted into the device. The bundled information includes, among other data, the Integrated Circuit Card ID (ICCID) and International Mobile Subscriber Identifier (IMSI) of the SIM card currently inserted into the device, the International Mobile Equipment Identifier (IMEI) encoded on the device, and a hardware thumbprint of the device.

According to one aspect of the invention, the service provider signing process further includes receiving the activation request in an activation server, where the activation request is typically relayed to the activation server via an activation client in communication with the device. The activation server generates the activation ticket based on the information that was bundled into the activation request. The activation server, in communication with backend servers for the service provider, may first verify whether the subscriber specified in the IMSI is associated with a valid account. In some embodiments, the activation server may perform other policy determinations that govern whether to generate an activation ticket, including such things as confirming whether the mobile country code (MCC) and mobile network code (MNC) specified in the IMSI is consistent with the expected distribution channel for the device, based on the device's IMEI.

According to one aspect of the invention, during the signing process, the activation server generates a signed activation ticket using an activation private key that is stored on, or is otherwise accessible by, the activation server. The generated activation ticket is formatted to include not only the information that was bundled into the activation request, but also an activation public key that will later be used on the device to validate the signature of the ticket. As a further security measure, the content of the activation ticket is obscured using encryption before sending the activation ticket back to the device. Encryption may be performed using a per-device symmetric key that is stored on, or is otherwise accessible by, both the device and the activation server. This key may be referred to as the shared obfuscation key.

According to one aspect of the invention, at the conclusion of the signing process, the generated activation ticket is received in the device from the activation server, typically via an activation client in communication with the device. The device stores the activation ticket for use during a subsequent service provider activation process.

According to one aspect of the invention, the service provider activation process queries the ICCID of the currently inserted SIM at startup and uses this value to determine whether an activation ticket has previously been stored for this SIM card. If so, the service provider activation process issues a command in the device to verify the activation ticket, including but not limited to, decrypting the activation ticket using the shared obfuscation key, validating the public activation key supplied in the ticket by the activation server, and using the validated key to validate the signature of the activation ticket.

According to one aspect of the invention, the service provider activation process verifies the content of the activation ticket against the device and the SIM card currently inserted into the device, including verifying that the IMEI and hardware thumbprints match those in the device, and that the ICCID and IMSI match those in the currently inserted SIM card. If the content of the activation ticket cannot be verified as matching the device and SIM card, then the activation ticket is treated as invalid, and the device is not activated for use with the service provider's network. If the content of the activation ticket is verified, then the device is activated for use with the service provider's network.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, in certain instances, well known or conventional details are not described in order to not unnecessarily obscure the present invention.

The description may include material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
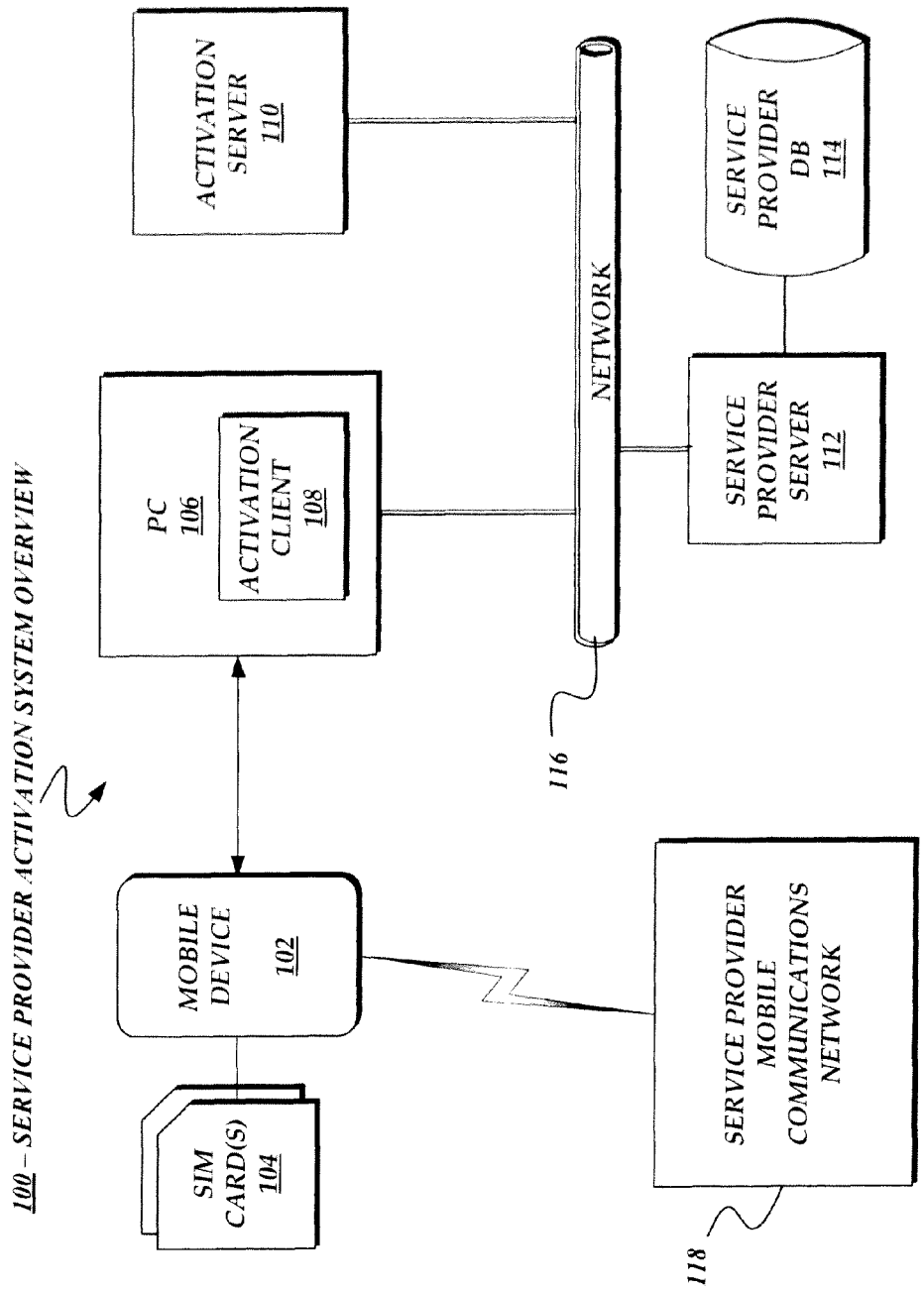
FIG. 1 is a block diagram overview of an architecture for a service provider activation system according to one exemplary embodiment of the invention.
Figure 4:
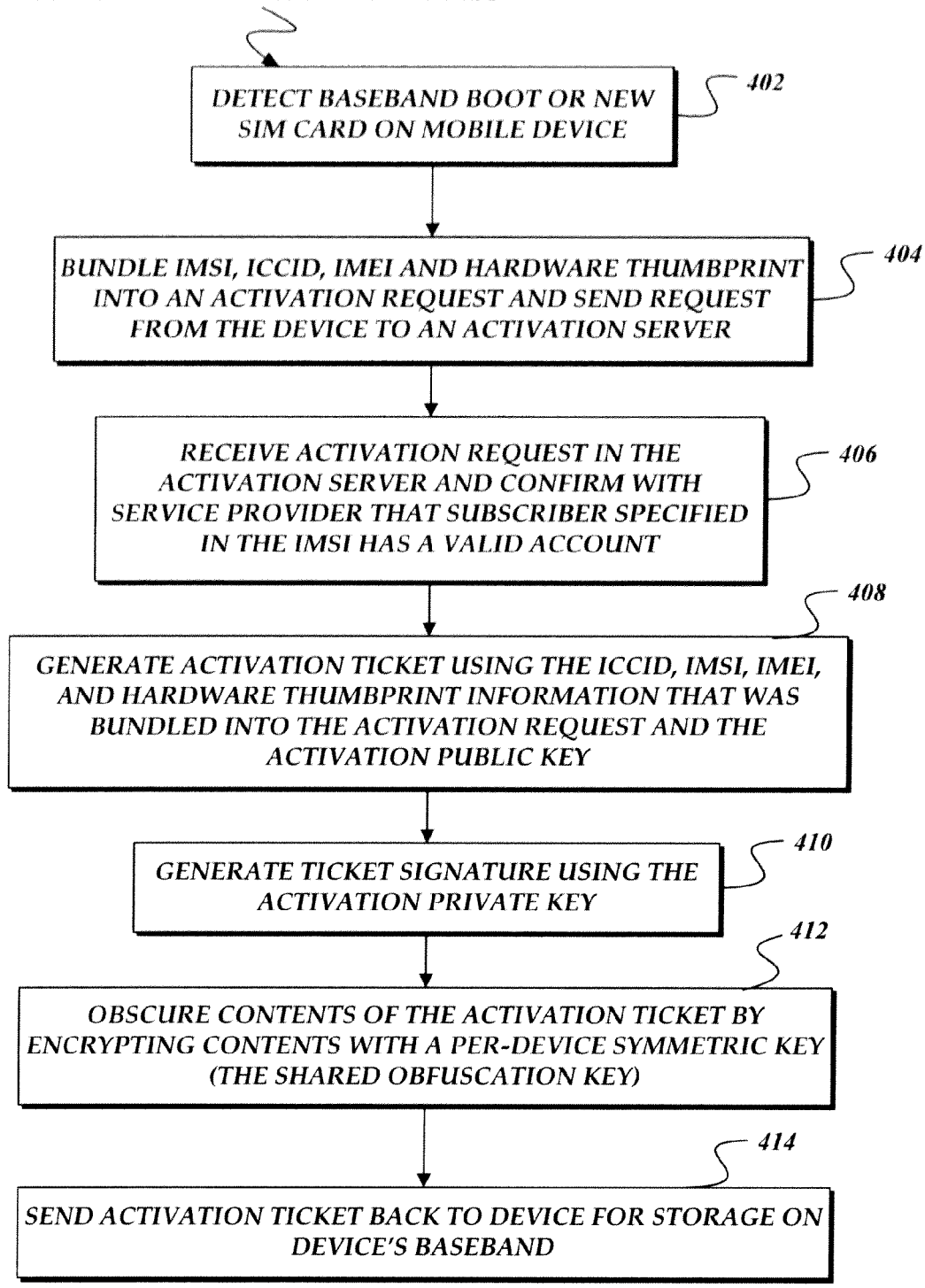
FIG. 4 is a flow diagrams illustrating certain aspects of performing a method for a service provider signing process according to one exemplary embodiment of the invention.
Figure 5A:
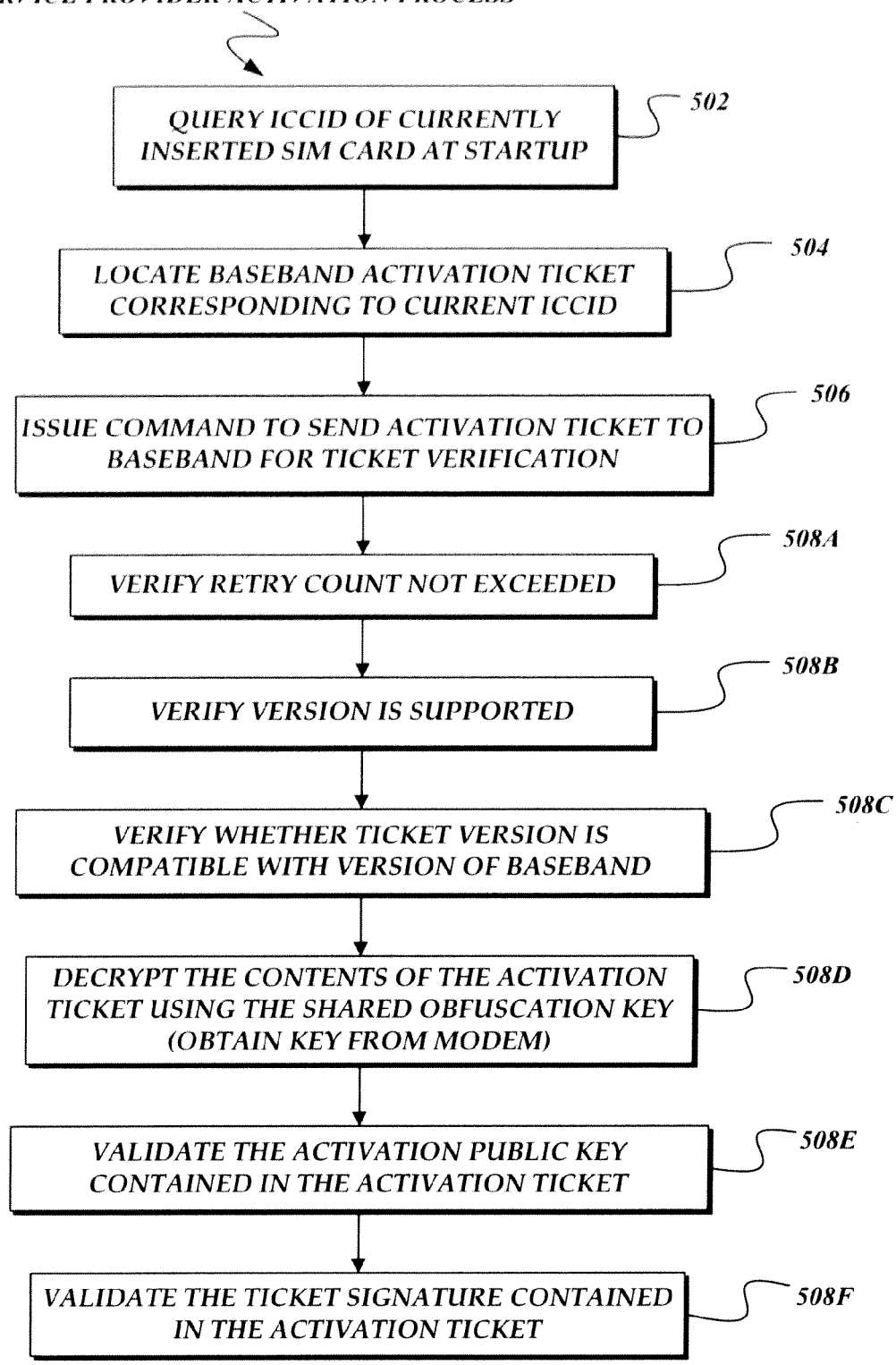
FIGS. 5A-5B are flow diagrams illustrating certain aspects of performing a method for a service provider activation process according to one exemplary embodiment of the invention.
Figure 5B:
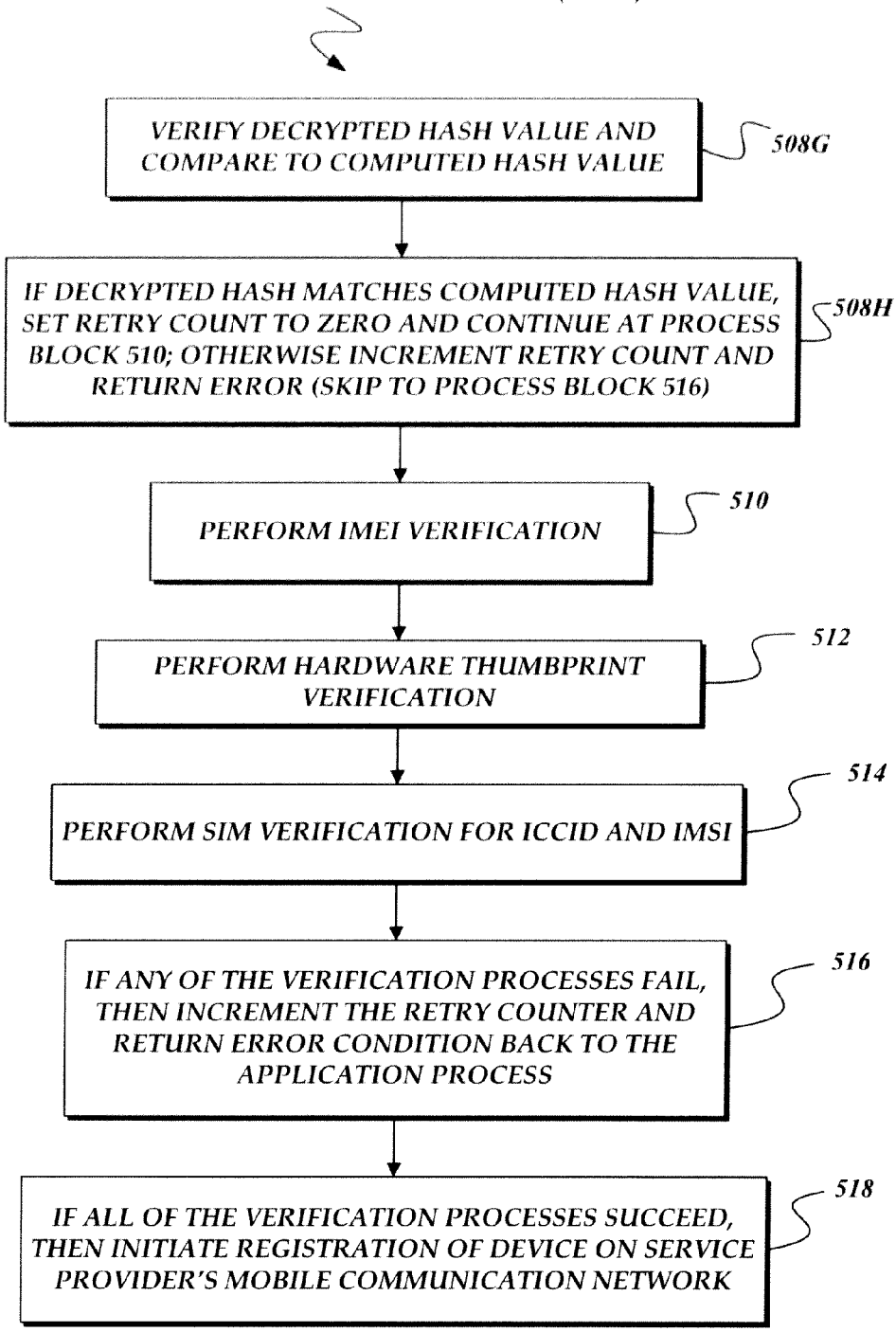

Various different system architectures may be used to implement the functions and operations described herein, such as to perform the methods shown in FIGS. 4, 5A-5B. The following discussion provides one example of such an architecture, but it will be understood that alternative architectures may also be employed to achieve the same or similar results. The service provider locking system 100 shown in FIG. 1 is one example which is based upon the iPhone device sold by Apple Computer, Inc. and back end clients and servers associated with the iPhone device and the mobile communication networks with which the iPhone device may be used. It should be understood, however, that the architecture 100 may differ and may further be used with devices and mobile communication networks not related to the iPhone device. The architecture 100 includes a mobile device 102, such as the iPhone device, and one or more SIM cards 104 which may be inserted into the mobile device 102. The SIM cards 104 enable the device to register with and use a mobile communications network 118 operated by a service provider associated with one of the SIM cards 104 and/or the device 102.

The mobile device 102 may further communicate with an activation client 108 operating on a personal computer (PC) 106 or other type of computing device to which the device 102 is connected. The activation client 108 is in communication with one or more activation servers 110, typically over a network 116. The network 116 may be any private or public internetwork or other type of communications path over which communications between the activation client 108 and activation server 110 may be transmitted. The activation server 110 may, in turn, be in communication with back end servers 112 of the service provider and a service provider database 114 that may contain information regarding the subscribers and devices that are allowed to register with and use the service provider's mobile communications network 118.

Figure 2:
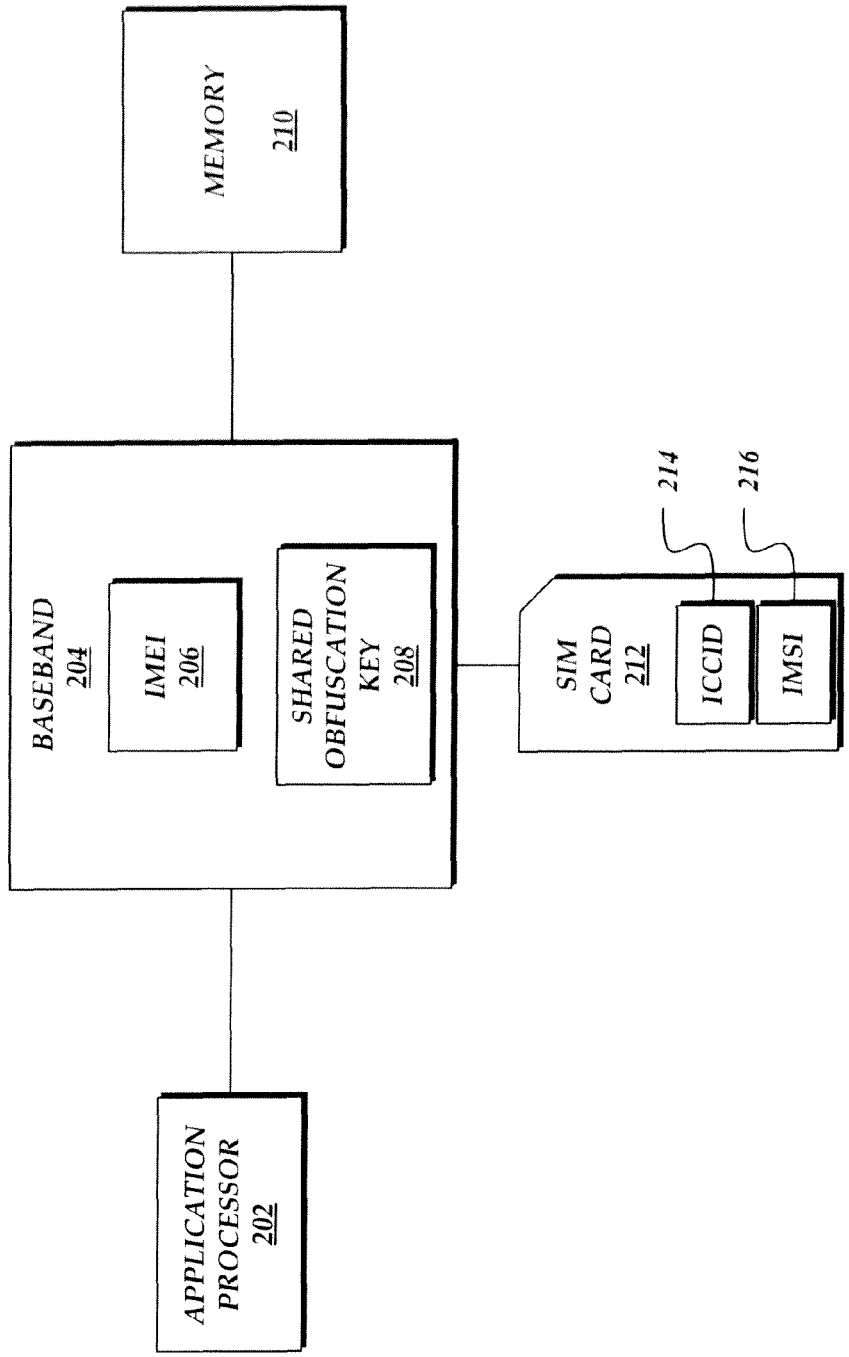
FIG. 2 is a block diagram overview of selected components of a mobile device according to one exemplary embodiment of the invention.

FIG. 2 is a block diagram overview of selected components 200 of a mobile device 100 according to one exemplary embodiment of the invention. The mobile device 100 may include an application processor (AP) 202 that is used to perform some of the functions of the service provider activation system in accordance with an embodiment of the invention. The AP 202 is typically implemented as firmware that operates in conjunction with a baseband (BB) 204 integrated circuit. Among other things, the BB 204 provides the operating system platform on which the functions of the mobile device are carried out. In a typical embodiment, the BB 204 incorporates a stored IMEI 206 that uniquely identifies the mobile device, as well as a shared obfuscation key 208, the use of which will be described in detail with reference to the activation ticket processing below. The device 100 further includes a memory component 210 that includes both volatile and non-volatile memory that may be used to store, among other data, the activation tickets used in the service provider activation system that will be described in further detail below.

The mobile device 100 may further include a SIM card slot into which a SIM card 212 may be inserted. The SIM card 212 may include an ICCID 214 that uniquely identifies the SIM card 212 and an IMSI 216 that designates the subscriber, and which is used to provision the mobile communications network 118 with which the device is to be used.

Figure 3:
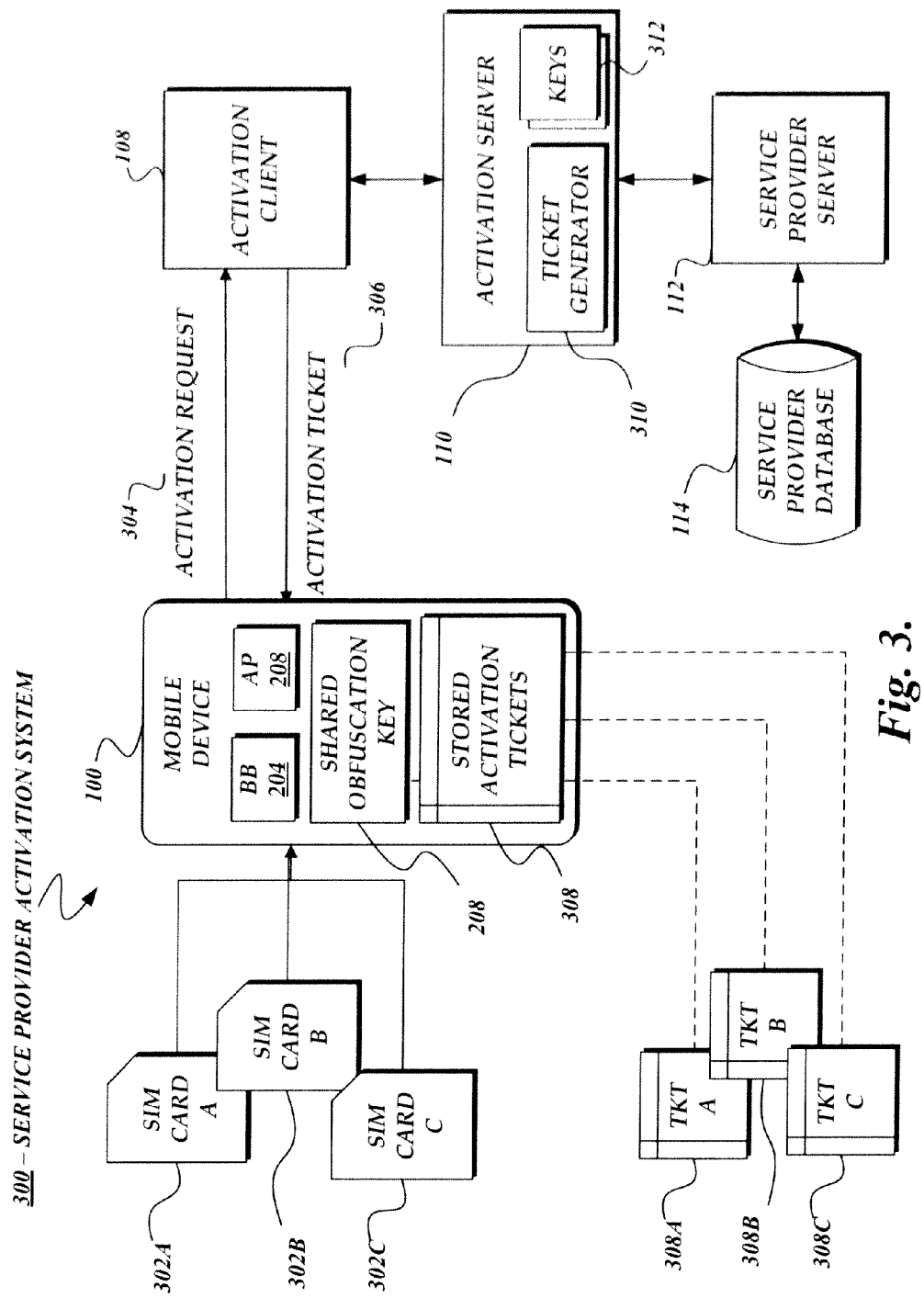
FIG. 3 is a block diagram overview of a service provider activation system according to one exemplary embodiment of the invention.

FIG. 3 is a block diagram overview of a service provider activation system according to one exemplary embodiment of the invention. As illustrated, having a BB 294 and an AP 208 may have inserted one of three SIM cards 302, SIM Card A 302A, SIM Card B 302B, and SIM Card C 302C. It should be understood that device 100 may be used with any one of a number of SIM cards, and that the three SIM cards are illustrated as an example only.

In one embodiment, the mobile device 100 may be a "generic" device, meaning that it was manufactured without a service provider lock. A device without a service provider lock is usable with any one of SIM cards A, B, and C, 302A, B, and C. In other embodiments, the mobile device 100 may have been previously locked so that it cannot be used with the SIM cards A, B, and C unless it is first unlocked. Once the device 100 is unlocked, it is generally capable of operating in only a limited service mode, meaning that it can only be used for emergency calls, and is not yet activated on a service provider network.

In one embodiment, upon detecting the insertion of one of the SIM cards A, B, or C, 302, or, alternatively, when the BB 204 boots, the AP 208 determines whether there is already stored an activation ticket 308 associated with the inserted SIM card A, B, or C. If not, the AP 208 initiates a signing process by issuing an activation request 304 to the activation server 110. The activation request 304 comprises information from the device 100 and currently inserted SIM card 302, including, for example, the IMEI, 206 IMSI 216, and ICCID 214 values, and bundled into the activation request 304.

In one embodiment, upon receipt of the activation request 304, the activation server 110 determines whether to generate an activation ticket 306 based on the information that was bundled into the activation request 304. An activation ticket 306 incorporates identifying information from both the device 100 and the inserted SIM card A, B, or C, using a ticket generator logic 310 and an activation public/private key pair 312 as will be described in further detail with reference to FIG. 4.

In a typical embodiment, the determination whether to generate an activation ticket 306 will depend, at least in part, on whether the service provider server 112 and/or service provider database 114 indicate that the IMSI 216 bundled into the activation request can be activated on the service provider's communication network 118. In some embodiments, the determination whether to generate the activation ticket will depend on other policy considerations, such as whether to generate an activation ticket 306 for a given IMEI/ICCID pair (using the IMEI/ICCID that was bundled into the activation request 304). If the activation server 110 determines that it cannot generate an activation ticket 306, then the activation request 304 will fail.

In one embodiment, once the activation ticket 306 has been generated, the activation server 110 obfuscates the content of the activation ticket 306 prior to returning the ticket to the device 100 to safeguard the contents of the activation ticket. In one embodiment, the activation ticket 306 is obfuscated by encrypting it with a per-device symmetric key. The per-device symmetric key may be derived from data unique to the device 100 and a key that is shared between the device and the activation server 110. The shared key is referred to in the illustrated example as a Shared Obfuscation Key 208 on the device 100, and also stored as one of the Keys 312 defined on the activation server 110. As an example, the per-device symmetric key is referred to as a Device Obfuscation Key, and is derived using the hardware thumbprint of the device 100 and the Shared Obfuscation Key stored on the server in Keys 312 using the following algorithm:

$$\text{DeviceObfuscationKey} = \text{SHA-1}(\text{HardwareThumbprint} \, || \, \text{SharedObfuscationKey})$$

After the activation ticket 306 has been generated and encrypted, the activation ticket 306 is ready to be sent back to the device 100, where it is stored along with any other previously stored activation tickets 308. The stored activation tickets 308A, B, and C, can subsequently be used by the AP 208 to initiate the activation process as will be described in further detail with reference to FIGS. 5A-5B.

In one embodiment, the format of the activation ticket 306/308 is as shown in Table 1. The format of the Activation Public Key that is included in the activation ticket is as shown in Table 2.

TABLE 1

Format of Activation Ticket

| NAME | SIZE (Octets) | ENCODING |
| --- | --- | --- |
| Version | 1 | BCD |
| Activation PublicKey | N | Public Key |
| ICCID | 10 | BCD |
| IMSI | 8 | BCD |
| IMEI | 8 | BCD |
| Hardware Thumbprint | 20 | Binary |
| TicketSignature | Key Length/8 | Binary |

TABLE 2

Format of Activation Public Key

| NAME | SIZE (Octets) | ENCODING |
| --- | --- | --- |
| Record Length | 4 | Binary |
| Serial Number | 4 | Binary |
| KeyLength | 4 | Binary |
| Exponent | 4 | Binary |
| Modulus | Key Length/8 | Binary |
| Montgomery Factor | Key Length/8 | Binary |
| KeySignature | Mkey Length/8 | Binary |

In one embodiment, the Version field of the activation ticket 306/308 allows the processing of activation tickets to be forward compatible. In one embodiment, the encoded integer Version allows future firmware releases in the device 100 to recognize older activation tickets and support them. The Version is also included in the digest of the activation ticket to verify that it cannot be altered. In one embodiment, the BB 204 will have a minimum record version compiled into it that can prevent rollback attacks if an activation ticket format is compromised.

In one embodiment, the Activation Public Key field in the activation ticket 306/308 may be formatted as shown in Table 2. It should be noted, however, that other public key formats may be employed with departing from the scope of the claims that follow.

The ICCID (Integrated Circuit Card ID) is a 20-digit number, defined in ISO/IEC 7812-1 that consists of: a 2 digit major industry identifier (89 for SIMs), a 1-3 digit country code (ITU-T E.164), an issuer identifier code, 1-4 digits (depending on country code length), which usually contains the MNC of the issuing network, an individual account identification number, and a 1 digit checksum.

The IMSI (International Mobile Subscriber Identifier) is a 15-digit number, defined in 3GPP TS 23.003 that consists of a 3 digit mobile country code (MCC), a 2 or 3 digit mobile network code (MNC), and a 9 or 10 digit mobile subscriber identity number (MSIN).

In one embodiment, the Hardware Thumbprint is a value that is typically derived from data that is unique to the device, such as the serial numbers of the hardware components of the device and the IMEI, plus a defined random sequence. For example, in one embodiment the thumbprint may be computed as follows:

```
HardwareThumbprint =
    SHA-1(SGold-SerialNumber || FlashSerialNumber || IMEI
    || Salt), where Salt is a random sequence.
```

In one embodiment, the Ticket Signature is generated as follows:

```
Message = Version || ICCID || IMSI || IMEI ||
HardwareThumbprint
Hash = SHA-1(Message)
EncodedMessage = 0x00 || 0x04 || PaddingString || 0x00 ||
Hash
TicketSignature = RSAEncrypt(activationPrivateKey,
EncodedMessage)
```

It should be noted that the described format of the activation ticket 306/308 set forth in Table 1 is just one example of a format that may be used, and other formats and data fields may comprise the activation ticket without departing from the scope of the claims that follow.

FIGS. 4, 5A, and 5B are flow diagrams illustrating certain aspects of service provider activation according to one exemplary embodiment of the invention. In FIG. 4, a method for a service provider signing process 400 is described. The method 400 to be performed begins at block 402, in which the device 100 detects a baseband boot or the insertion of a new SIM card. At block 404, the method 400 bundles the IMSI, ICCID, IMEI and a hardware thumbprint into an activation request, and sends the request from the device to an activation server. At block 406, the activation server receives the request, and determines whether to generate an activation ticket in response to the request based on certain policy considerations, such as whether the back end servers associated with the service provider confirm that the IMSI information is valid for the service provider's communication network.

In one embodiment, at process block 408, the method 400 generates the activation ticket using the ICCID, IMSI, IMEI, and hardware thumbprint information that was bundled into the activation request. In one embodiment, the method 400 includes an activation public key into the ticket and, at block 410 signs the ticket using a corresponding activation private key that is securely stored on the activation server. At block 412, the method 400 obscures the contents of the activation ticket by encrypting the contents with a device obfuscation key that is derived from information specific to the device, such as the hardware thumbprint provided in the activation request, and a shared obfuscation key that is available to both the activation server and the device. At process block 414, the method 400 concludes with sending the activation ticket back to the device for storage. For example, the activation ticket may be stored in memory on the device that is accessible to the device's baseband.

Turning now to FIGS. 5A-5B, a method for a service provider activation process 500 is described. The method 500 to be performed begins at block 502, in which the device 100 queries the ICCID of the currently inserted SIM card at startup. At block 504, the method 500 uses the ICCID to locate an activation ticket corresponding to the current ICCID. At block 506, the device issues a command to initiate verification of the activation ticket. Verification of the activation ticket will cause the device's baseband to transition out of limited service mode and register on a communications network. The command will return an error code if the ticket cannot be successfully verified.

In a typical embodiment, the method 500 performs ticket verification after determining whether the SIM Card currently inserted into the device is in a ready state, i.e., whether the SIM is unlocked. If not, then the method 500 performs ticket verification after the SIM card has been successfully unlocked.

The method 500 continues at process blocks 508A-508H, to perform the various aspects of activation ticket verification. At block 508A, the method 500 first verifies that the retry count has not been exceeded. A retry counter will be incremented for each unsuccessful attempt to unlock and activate service on the device using the activation ticket verification command. Only a pre-defined number of attempts at verification are allowed to prevent against brute-force attacks, in which there are numerous attempts to activate the device.

In one embodiment, the method 500 continues at blocks 508B/508C, to parse out the version information in the activation ticket from the encrypted information, and to determine whether the version of the activation ticket to be verified is supported in the current version of the device's baseband.

At block 508D, the method 500 decrypts the contents of the activation ticket using a device obfuscation key that is derived from the shared obfuscation key stored on the device and information that is specific to the device, such as the device's hardware thumbprint. At block 508E, the method 500 validates the activation public key supplied in the activation ticket, and at 508F uses the public key to validate the ticket signature. At blocks 508G/H, the method 500 concludes the ticket verification process by verifying whether the decrypted hash value of the activation ticket compares correctly to the computed hash value. If so, the method continues at process block 510; otherwise the ticket verification fails and the method branches to block 516.

At process block 510, in order to prevent an activation ticket from one device being used on another device, the IMEI in the activation ticket is compared to the IMEI stored in the device. In one embodiment, all 15 digits of the respective IMEIs must match. If they do not, the BB activation ticket At process block 512, the method 500 continues to verify the activation ticket by determining the value of the hardware thumbprint contained in the activation ticket, and comparing that to the hardware thumbprint of the device. If they do not match, the activation ticket is treated as invalid.

At process block 514, the method 500 continues to verify the activation ticket by comparing the value of the ICCID contained in the activation ticket to the ICCID of the SIM card currently inserted in the device. In special cases, the ICCID verification is bypassed, such as when the ICCID is encoded with 10 0xFF octets. Similarly, at process block 516, the method 500 continues to verify the activation ticket by comparing the value of the IMSI contained in the activation ticket to the IMSI of the SIM card currently inserted into the device. Again, in special cases, the IMSI verification is bypassed, such as when the IMS is encoded with 10 0xFF octets.

At process block 516, the method increments the retry counter and returns an error in response to the command should any of the activation ticket verification processes fail. At process block 518, if the verification processes are successful, then the device can activate service on the device by initiating registration of the device on the service provider's mobile communication network.

Figure 6:
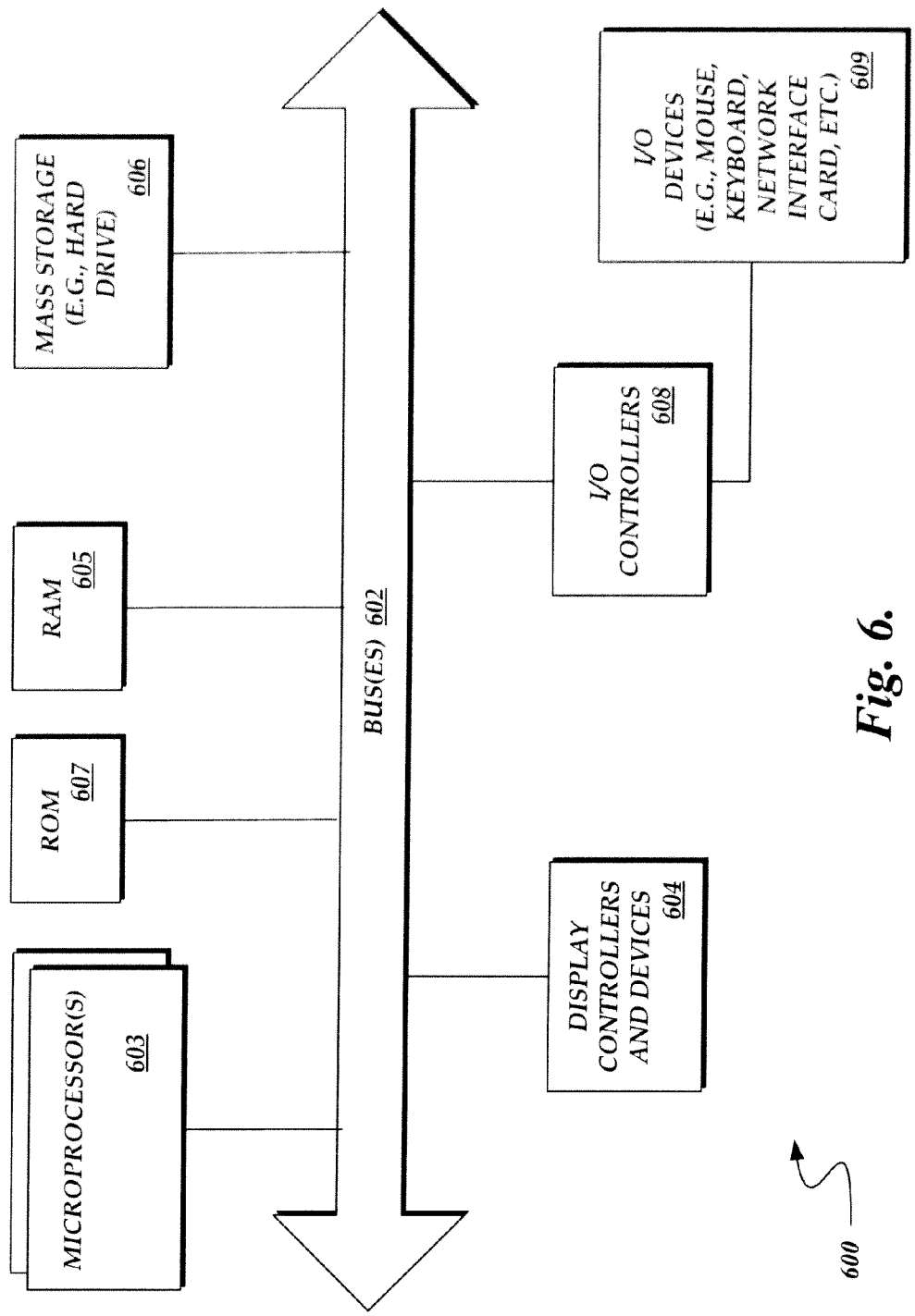
FIG. 6 is a block diagram overview of an exemplary embodiment of a general purpose computer system in which certain components of a service provider activation system may be implemented according to one exemplary embodiment of the invention, including but not limited to, components such as the activation client, activation server, and other back end servers of the service providers of mobile communications networks.

FIG. 6 illustrates an example of a typical computer system in which some aspects of the invention may be practiced, such as the backend clients and servers used to provide service activation of a mobile device. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 6 may, for example, be a Macintosh computer from Apple Computer, Inc.

As shown in FIG. 6, the computer system 601, which is a form of a data processing system, includes a bus 602 which is coupled to a microprocessor(s) 603 and a ROM (Read Only Memory) 607 and volatile RAM 605 and a non-volatile memory 606. In one embodiment, the microprocessor 603 may be a G3 or G4 microprocessor from Motorola, Inc. or one or more G5 microprocessors from IBM. The bus 602 interconnects these various components together and also interconnects these components 603, 607, 605, and 606 to a display controller and display device 604 and to peripheral devices such as input/output (I/O) devices which may be mice, keyboards, modems, network interfaces, printers and other devices which are well known in the art. Typically, the input/output devices 609 are coupled to the system through input/output controllers 608. The volatile RAM (Random Access Memory) 605 is typically implemented as dynamic RAM (DRAM) which requires power continually in order to refresh or maintain the data in the memory. The mass storage 606 is typically a magnetic hard drive or a magnetic optical drive or an optical drive or a DVD RAM or other types of memory systems which maintain data (e.g. large amounts of data) even after power is removed from the system. Typically, the mass storage 606 will also be a random access memory although this is not required. While FIG. 6 shows that the mass storage 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well known in the art. In one embodiment the I/O controller 608 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, RAM 605, mass storage 606 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

What is claimed is:

1. A machine implemented method of activating a mobile device, the method comprising:
issuing, from a device having a currently inserted subscriber identification module (SIM) card, an activation request, the activation request comprising a first data that uniquely identifies the device and a second data that uniquely identifies the currently inserted SIM card;
storing in the mobile device a signed activation record comprising the first data and the second data, the activation record having been generated and signed by an activation server responding to the activation request;
verifying the activation record against the currently inserted SIM card; and
registering the device with a communications network after successfully verifying the activation record.

2. The method of claim 1, wherein the first data that uniquely identifies the device includes a serial number of the device.

3. The method of claim 2, wherein the serial number of the device comprises an International Mobile Equipment Identifier (IMEI) encoded in the device.

4. The method of claim 1, wherein the first data that uniquely identifies the device includes a hardware thumbprint of the device.

5. The method of claim 4, wherein the hardware thumbprint of the device is derived from at least one of a serial number of a baseband component in the device, a serial number of a memory component of the device, a serial number of the device, in combination with a random number.

6. The method of claim 1, wherein the second data that uniquely identifies the SIM card includes a serial number of the SIM card.

7. The method of claim 6, wherein the serial number of the SIM card comprises an Integrated Circuit Card ID (ICCID) encoded on the SIM card.

8. The method of claim 1, wherein the second data that uniquely identifies the SIM card includes a subscriber identifier associated with SIM card.

9. The method of claim 8, wherein the subscriber identifier associated with the SIM card comprises an International Mobile Subscriber Identifier (IMSI) that designates the subscriber authorized to use the SIM card.

10. The method of claim 1, wherein the activation record stored in the device further comprises an activation public key, the activation record having been signed by the activation server using an activation private key corresponding to the activation public key.

11. The method of claim 1, wherein verifying the activation record stored in the device further comprises decrypting a content of the activation record using a device obfuscation key that is derived from a hardware thumbprint of the device and a shared obfuscation key.

12. The method of claim 1, wherein verifying the activation record stored in the device further comprises validating an activation public key contained in the activation record.

13. The method of claim 12, wherein verifying the activation record stored in the device further comprises validating a signature of the activation record stored in the device using the validated activation public key.

14. The method of claim 1, wherein verifying the activation record stored in the device further comprises verifying that a maximum retry counter has not reached a maximum count.

15. The method of claim 1, further comprising incrementing a maximum retry counter when the activation record is not successfully verified.

16. A machine implemented method of registering a user device in a wireless communications network, the user device comprising a security module, the method comprising:
 issuing, from the user device, an activation request comprising a first data configured to uniquely identify the user device, and a second data configured to uniquely identify the security module;
 storing in the user device a signed activation record comprising at least the second data and the first data, the signed activation record having been generated and signed by a network entity based at least in part on the activation request;
 verifying the activation record against the security module; and
 upon a successful verification of the activation record against the security module, providing verification data to the network, the verification data configured to cause registration of the user device with the network.

17. The method of claim 16, wherein the network entity comprises an activation server in communication with the network.

18. The method of claim 17, wherein the activation record further comprises a public activation key, the activation record having been signed by the network entity using a private activation key corresponding to the public activation key.

19. The method of claim 16, wherein the first data comprises a serial number of the user device.

20. The method of claim 19, wherein the serial number of the user device comprises an International Mobile Equipment Identifier (IMEI) associated with the user device.

21. The method of claim 16, wherein the first data comprises a hardware thumbprint of the user device.

22. The method of claim 21, wherein the hardware thumbprint is derived from at least one of: (i) a serial number of a baseband component in the user device, (ii) a serial number of a memory component of the user device, (iii) a serial number of the user device, and/or (iv) a random number.

23. The method of claim 16, wherein the second data comprises a serial number of the security module.

24. The method of claim 16, wherein the second data comprises an identifier associated with security module, the identifier comprising an International Mobile Subscriber Identifier (IMSI) associated with a subscriber authorized to use the security module.

25. The method of claim 16, wherein verifying the activation record further comprises decrypting a content of the activation record based at least in part on:
 (i) a private obfuscation key obtained using a hardware thumbprint of the user device, and
 (ii) a shared obfuscation key.

26. The method of claim 16, wherein:
 the activation record comprises a public activation key; and
 verifying the activation record further comprises validating the public activation key.

27. The method of claim 26, wherein verifying the activation record further comprises validating a signature of the activation record based at least in part on the validated public activation key.

28. The method of claim 16, wherein verifying the activation record further comprises verifying that an activation retry counter has not reached a maximum count associated with the network.

29. The method of claim 28, further comprising incrementing the activation retry counter when the activation record is not successfully verified.

30. The method of claim 16, wherein the registration of the user device with the network comprises registration with the network entity.

31. The method of claim 16, wherein the security module comprises a card-like form factor that is insertable and removable from the user device.

32. A method of operating a wireless communications apparatus comprising a subscriber identification security module, the method comprising:
 issuing an activation request comprising a first data configured to uniquely identify the communications apparatus, and a second data configured to uniquely identify the security module;
 storing, in the communications apparatus, a signed activation record comprising at least the first data and the second data, the signed activation record having been generated by an entity of a communications network, based at least in part on the activation request; and
 providing a first information configured to enable verification of the activation record against a second information associated with the security module, the first information comprising at least a portion of the signed activation record; and
 wherein the wireless communications apparatus is configured to be registered with the communications network based at least in part on a successful verification of the signed activation record.

33. A machine implemented method of registering a user device in a wireless communications network, the user device comprising a subscriber identification means, the method comprising:
   a step for issuing from the user device an activation request comprising a first data for uniquely identifying the device, and a second data for uniquely identifying the subscriber identification means;
   a step for obtaining a signed activation record comprising at least the first and second data, the signed activation record having been generated by a network entity based at least in part on the activation request;
   a step for verifying the activation record against the subscriber identification means; and
   a step for, upon a successful verification of the activation record against the subscriber identification means, providing a verification data to the network, the verification data configured to cause registration of the user device with the network.

34. A user mobile device capable of operating in a wireless communications network, the mobile device configured according to a process, comprising:
   providing a security module within the mobile device;
   causing issuance of an activation request comprising a first data configured to uniquely identify the mobile device, and a second data configured to uniquely identify the security module;
   causing receipt of a signed activation record comprising at least the first data and the second data, the activation record having been generated by an entity of the wireless communications network based at least in part on the activation request;
   causing provision of a first information configured to enable verification of the activation record against a second information associated with the security module, the first information associated with the security module comprising at least a portion of the activation record; and
   causing registration of the mobile device with the network based at least in part on a successful verification of the activation record.

35. A device adapted for operation in a wireless communications network, the device having a first data and a second data, and a subscriber identification security module associated therewith, the device operable according to the method comprising:
   causing issuance of an activation request comprising the first data and the second data;
   causing provision of a first information configured to enable verification of a signed activation record against a second information associated with the security module, the first information associated with the security module comprising at least a portion of the activation record; and
   causing registration of the device with the network based at least in part on a successful verification of the activation record;
   wherein:
   the activation record having been generated by an entity of the wireless communications network based at least in part on the activation request; and
   the first data enables unique identification of the device, and the second data enables unique identification of the security module.

36. The wireless user communications device of claim 35, wherein the signed activation record comprises at least the first data and the second data.

37. A method of registering a wireless communications apparatus with a wireless network, the wireless communications apparatus having a first data, a second data, and a subscriber identification security module associated therewith, the method comprising:
   providing for issuance of an activation request comprising the first data and the second data;
   causing provision of a first information configured to enable verification of a signed activation record against a second information associated with the security module, the first information configured to enable verification of the activation record comprising at least a portion of the activation record; and
   providing for registration of the wireless communications apparatus with the network based at least in part on a successful verification of the activation record;
   wherein:
   the signed activation record having been generated by an entity of the wireless network based at least in part on the activation request;
   the first data is configured to uniquely identify the wireless communications apparatus, and the second data is configured to uniquely identify the security module.

38. The method of claim 37, wherein the signed activation record comprises at least the first data and the second data.

39. The method of claim 38, wherein the issuance of the activation request is based at least in part on an input from a user associated with the wireless communications apparatus.

40. The method of claim 39, wherein the registration of the wireless communications apparatus with the network enables the user to communicate over the wireless network.

41. A method of providing service in a wireless communications network, the method comprising:
   providing a wireless communications apparatus to a user, the wireless communications apparatus having a first data, a second data, and a subscriber identification security module associated therewith;
   causing issuance of an activation request comprising the first data and the second data;
   causing receipt of a signed activation record comprising at least the first data and the second data, the activation record having been generated by an entity of a communications network, the generation based at least in part on the activation request;
   causing provision of a first information configured to enable verification of the activation record against a second information associated with the security module, the first information comprising at least a portion of the activation record; and
   causing registration of the wireless communications apparatus with the network, based at least in part on a successful verification of the activation record;
   wherein the first data is configured to uniquely identify the wireless communications apparatus, and the second data is configured to uniquely identify the security module.

42. The method of claim 41, wherein the registration of the wireless communications apparatus with the network is configured to enable a subscriber associated with the wireless communications apparatus to communicate over the wireless network with at least one other wireless communication apparatus associated with the network.

43. A subscriber identification security module adapted to enable registration of a wireless communications apparatus with a wireless network, the apparatus having a first data and a second data associated therewith, the module configured to be made operable according to the method comprising:

enabling issuance of an activation request comprising the first data and the second data configured;

enabling provision of a first information configured to enable verification of the signed activation record against a second information associated with the security module, the first information configured to enable verification of the activation record comprising at least a portion of the activation record; and wherein:

the signed activation record having been generated by an entity of the wireless network based at least in part on the activation request;

the first data is configured to uniquely identify the wireless communication apparatus, and the second data is configured to uniquely identify the security module; and successful verification of the activation record is configured to enable registration of the wireless communication apparatus with the wireless network.

44. The subscriber identification security module of claim 43, wherein the signed activation record comprises at least the first data and the second data.

45. A subscriber identification security module adapted to enable registration of a wireless communications apparatus with a wireless network, the apparatus having a first data and a second data associated therewith, the security module configured to be made operable according to the method comprising:

enabling issuance of an activation request comprising the first data and the second data configured;

enabling provision of a first information configured to enable verification of a signed activation record against a second information associated with the security module, the first information configured to enable verification of the activation record comprising at least a portion of the activation record; and enabling registration of the wireless communication apparatus with the network based at least in part on a successful verification of the activation record;

wherein:

the activation record having been generated by an entity of the wireless network based at least in part on the activation request; and the first data is configured to uniquely identify the wireless communication apparatus, and the second data is configured to uniquely identify the security module.

46. The subscriber identification security module of claim 45, wherein the signed activation record comprises at least the first data and the second data.

47. The subscriber identification security module of claim 45, wherein the issuance of the activation request is based at least in part on an input from a user associated with the wireless communication apparatus.

48. The subscriber identification security module of claim 45, wherein the entity of the wireless network comprises an activation server in communication with the wireless network.

49. The subscriber identification security module of claim 45, wherein the activation record further comprises a public activation key, the activation record having been signed by the entity of the wireless network using a private activation key corresponding to the public activation key.

50. The subscriber identification security module of claim 45, wherein the first data comprises a serial number of the wireless communications apparatus.

51. The subscriber identification security module of claim 50, wherein the serial number of the wireless communications apparatus comprises an International Mobile Equipment Identifier (IMEI) associated with the wireless communications apparatus.

52. The subscriber identification security module of claim 45, wherein the first data comprises a hardware thumbprint of the wireless communications apparatus.

53. The subscriber identification security module of claim 52, wherein the hardware thumbprint is derived from at least one of: (i) a serial number of a baseband component in the wireless communications apparatus, (ii) a serial number of a memory component of the wireless communications apparatus, (iii) a serial number of the wireless communications apparatus, and/or (iv) a random number.

54. The subscriber identification security module of claim 45, wherein the second data comprises a serial number of the security module.

55. The subscriber identification security module of claim 45, wherein the second data comprises an identifier associated with security module, the identifier comprising an International Mobile Subscriber Identifier (IMSI) associated with a subscriber authorized to use the security module.

56. The method of claim 32, wherein the entity of the communications network comprises an activation server in communication with the communications network.

57. The method of claim 32, wherein the activation record further comprises a public activation key, the activation record having been signed by the entity of the communications network using a private activation key corresponding to the public activation key.

58. The method of claim 32, wherein the first data comprises a serial number of the wireless communications apparatus.

59. The method of claim 58, wherein the serial number of the wireless communications apparatus comprises an International Mobile Equipment Identifier (IMEI) associated with the wireless communications apparatus.

60. The method of claim 32, wherein the first data comprises a hardware thumbprint of the wireless communications apparatus.

61. The method of claim 60, wherein the hardware thumbprint is derived from at least one of: (i) a serial number of a baseband component in the wireless communications apparatus, (ii) a serial number of a memory component of the wireless communications apparatus, (iii) a serial number of the wireless communications apparatus, and/or (iv) a random number.

62. The method of claim 32, wherein the second data comprises a serial number of the security module.

63. The method of claim 32, wherein the second data comprises an identifier associated with security module, the identifier comprising an International Mobile Subscriber Identifier (IMSI) associated with a subscriber authorized to use the security module.

64. The method of claim 32, wherein verification of the activation record further comprises verifying that an activation retry counter has not reached a maximum count associated with the communications network.

65. The method of claim 64, further comprising incrementing the activation retry counter when the activation record is not successfully verified.

66. The method of claim 32, wherein the registration of the wireless communications apparatus with the communications network comprises registration with the entity of the communications network.

67. The method of claim 32, wherein the security module comprises a card-like form factor that is insertable and removable from the wireless communications apparatus.

68. The machine implemented method of claim 33, wherein the network entity comprises an activation server in communication with the network.

69. The machine implemented method of claim 33, wherein the activation record further comprises a public activation key, the activation record having been signed by the network entity using a private activation key corresponding to the public activation key.

70. The machine implemented method of claim 33, wherein the first data comprises a serial number of the user device.

71. The machine implemented method of claim 70, wherein the serial number of the user device comprises an International Mobile Equipment Identifier (IMEI) associated with the user device.

72. The machine implemented method of claim 33, wherein the first data comprises a hardware thumbprint of the user device.

73. The machine implemented method of claim 72, wherein the hardware thumbprint is derived from at least one of: (i) a serial number of a baseband component in the user device, (ii) a serial number of a memory component of the user device, (iii) a serial number of the user device, and/or (iv) a random number.

74. The machine implemented method of claim 33, wherein the second data comprises a serial number of the subscriber identification means.

75. The machine implemented method of claim 33, wherein the second data comprises an identifier associated with subscriber identification means, the identifier comprising an International Mobile Subscriber Identifier (IMSI) associated with a subscriber authorized to use the subscriber identification means.

76. The user mobile device of claim 34, wherein the entity of the communications network comprises an activation server.

77. The user mobile device of claim 76, wherein the activation record further comprises a public activation key, the activation record having been signed by the entity of the communications network using a private activation key corresponding to the public activation key.

78. The user mobile device of claim 34, wherein the first data comprises a serial number of the user mobile device.

79. The user mobile device of claim 78, wherein the serial number of the user mobile device comprises an International Mobile Equipment Identifier (IMEI) associated with the user mobile device.

80. The user mobile device of claim 34, wherein the first data comprises a hardware thumbprint of the user mobile device.

81. The user mobile device of claim 80, wherein the hardware thumbprint is derived from at least one of: (i) a serial number of a baseband component in the user mobile device, (ii) a serial number of a memory component of the user mobile device, (iii) a serial number of the user mobile device, and/or (iv) a random number.

82. The user mobile device of claim 34, wherein the second data comprises a serial number of the security module.

83. The user mobile device of claim 34, wherein the second data comprises an identifier associated with security module, the identifier comprising an International Mobile Subscriber Identifier (IMSI) associated with a subscriber authorized to use the security module.

84. The user mobile device of claim 34, wherein verification of the activation record further comprises decryption of a content of the activation record based at least in part on:

(i) a private obfuscation key obtained using a hardware thumbprint of the mobile device, and
(ii) a shared obfuscation key.

85. The user mobile device of claim 34, wherein:
the activation record comprises a public activation key; and
verification of the activation record further comprises validation of the public activation key.

86. The user mobile device of claim 85, wherein verification of the activation record further comprises validation of a signature of the activation record based at least in part on the validated public activation key.

87. The device of claim 35, wherein the entity of the wireless communications network comprises an activation server.

88. The device of claim 36, wherein the activation record further comprises a public activation key, the activation record having been signed by the network entity using a private activation key corresponding to the public activation key.

89. The device of claim 35, wherein the first data comprises a serial number of the device.

90. The device of claim 89, wherein the serial number of the device comprises an International Mobile Equipment Identifier (IMEI) associated with the device.

91. The device of claim 36, wherein the first data comprises a hardware thumbprint of the device.

92. The device of claim 91, wherein the hardware thumbprint is derived from at least one of (i) a serial number of a baseband component in the device, (ii) a serial number of a memory component of the device, (iii) a serial number of the device, and/or (iv) a random number.

93. The device of claim 36, wherein the second data comprises a serial number of the security module.

94. The device of claim 36, wherein the second data comprises an identifier associated with security module, the identifier comprising an International Mobile Subscriber Identifier (IMSI) associated with a subscriber authorized to use the security module.

95. The method of claim 37, wherein the entity of the wireless network comprises an activation server.

96. The method of claim 95, wherein the activation record further comprises a public activation key, the activation record having been signed by the entity of the wireless network using a private activation key corresponding to the public activation key.

97. The method of claim 38, wherein the first data comprises a serial number of the wireless communications apparatus.

98. The method of claim 97, wherein the serial number of the wireless communications apparatus comprises an International Mobile Equipment Identifier (IMEI) associated with the wireless communications apparatus.

99. The method of claim 38, wherein the first data comprises a hardware thumbprint of the wireless communications apparatus.

100. The method of claim 99, wherein the hardware thumbprint is derived from at least one of: (i) a serial number of a baseband component in the wireless communications apparatus, (ii) a serial number of a memory component of the wireless communications apparatus, (iii) a serial number of the user wireless communications apparatus, and/or (iv) a random number.

101. The method of claim 38, wherein the second data comprises a serial number of the security module.

102. The method of claim 38, wherein the second data comprises an identifier associated with security module, the identifier comprising an International Mobile Subscriber Identifier (IMSI) associated with a subscriber authorized to use the security module.

103. The method of claim 37, wherein verification of the activation record further comprises decryption of a content of the activation record based at least in part on:
(i) a private obfuscation key obtained using a hardware thumbprint of the wireless communications apparatus, and
(ii) a shared obfuscation key.

104. The method of claim 38, wherein:
the activation record comprises a public activation key; and
verification of the activation record further comprises validation of the public activation key.

105. The method of claim 104, wherein verification of the activation record further comprises validation of a signature of the activation record based at least in part on the validated public activation key.

106. The method of claim 37, wherein verification the activation record further comprises verification that an activation retry counter has not reached a maximum count associated with the wireless communications network.

107. The method of claim 106, further comprising adding an increment of the activation retry counter when the activation record is not successfully verified.

108. The method of claim 37, wherein the registration of the wireless communications apparatus with the wireless network comprises registration with the entity of the wireless network.

109. The method of claim 37, wherein the security module comprises a card-like form factor that is insertable and removable from the wireless communications apparatus.

110. The method of claim 41, wherein the activation record further comprises a public activation key, the activation record having been signed by the entity of the wireless network using a private activation key corresponding to the public activation key.

111. The method of claim 41, wherein the first data comprises a serial number of the wireless communications apparatus.

112. The method of claim 111, wherein the serial number of the wireless communications apparatus comprises an International Mobile Equipment Identifier (IMEI) associated with the wireless communications apparatus.

113. The method of claim 41, wherein the second data comprises a serial number of the security module.

114. The method of claim 41, wherein the second data comprises an identifier associated with security module, the identifier comprising an International Mobile Subscriber Identifier (IMSI) associated with a subscriber authorized to use the security module.

115. The subscriber identification security module of claim 43, wherein the entity of the wireless network comprises an activation server.

116. The subscriber identification security module of claim 115, wherein the activation record further comprises a public activation key, the activation record having been signed by the network entity using a private activation key corresponding to the public activation key.

117. The subscriber identification security module of claim 116, wherein the first data comprises a serial number of the wireless communications apparatus.

118. The subscriber identification security module of claim 117, wherein the serial number of the wireless communications apparatus comprises an International Mobile Equipment Identifier (IMEI) associated with the wireless communications apparatus.

119. The subscriber identification security module of claim 43, wherein the first data comprises a hardware thumbprint of the wireless communications apparatus.

120. The subscriber identification security module of claim 119, wherein the hardware thumbprint is derived from at least one of: (i) a serial number of a baseband component in the wireless communications apparatus, (ii) a serial number of a memory component of the wireless communications apparatus, (iii) a serial number of the wireless communications apparatus, and/or (iv) a random number.

121. The subscriber identification security module of claim 43, wherein the second data comprises a serial number of the security module.

122. The subscriber identification security module of claim 43, wherein the second data comprises an identifier associated with security module, the identifier comprising an International Mobile Subscriber Identifier (IMSI) associated with a subscriber authorized to use the security module.

\* \* \* \* \*